US012559021B2

(12) United States Patent
Mitomo et al.

(10) Patent No.: US 12,559,021 B2
(45) Date of Patent: Feb. 24, 2026

(54) VEHICULAR LAMP FITTING

(71) Applicants: STANLEY ELECTRIC CO., LTD.,
Tokyo (JP); HONDA MOTOR CO.,
LTD., Tokyo (JP)

(72) Inventors: Yuri Mitomo, Tokyo (JP); Yuichiro
Nishimura, Tokyo (JP); Takahiko
Tokiwa, Tokyo (JP); Keiichi Hirata,
Tokyo (JP); Minoru Yamaguchi, Tokyo
(JP); Satoshi Ito, Tokyo (JP); Keishi
Shiomi, Tokyo (JP); Hideaki Aizawa,
Tokyo (JP); Shunichi Nakano, Tokyo
(JP); Takato Watanabe, Tokyo (JP)

(73) Assignees: STANLEY ELECTRIC CO., LTD.,
Tokyo (JP); HONDA MOTOR CO.,
LTD., Tokyo (JP)

( * ) Notice: Subject to any disclaimer, the term of this
patent is extended or adjusted under 35
U.S.C. 154(b) by 181 days.

(21) Appl. No.: 18/224,234

(22) Filed: Jul. 20, 2023

(65) Prior Publication Data

US 2024/0025332 A1 Jan. 25, 2024

(30) Foreign Application Priority Data

Jul. 20, 2022 (JP) ................................. 2022-115316

(51) Int. Cl.
B60Q 1/00 (2006.01)
B60Q 1/04 (2006.01)
F21S 41/20 (2018.01)
G01S 7/02 (2006.01)

(52) U.S. Cl.
CPC ......... B60Q 1/0017 (2013.01); B60Q 1/0408
(2013.01); F21S 41/20 (2018.01); G01S 7/027
(2021.05)

(58) Field of Classification Search
None
See application file for complete search history.

(56) References Cited

U.S. PATENT DOCUMENTS

2025/0058697 A1 * 2/2025 Katsurada ................ H01Q 1/42

FOREIGN PATENT DOCUMENTS

JP 2020-38181 A 3/2020
JP 2021-91303 * 6/2021 ............... B60Q 1/00

* cited by examiner

*Primary Examiner* — Kenneth B Wells
(74) *Attorney, Agent, or Firm* — KENEALY VAIDYA
LLP

(57) ABSTRACT

A vehicle lighting fixture comprising a housing, an outer
lens attached to the housing and forming a first space
between the outer lens and the housing, and a lighting-
fixture unit arranged in the first space, wherein the outer lens
includes a light-transmitting part through which light emit-
ted from the lighting-fixture unit passes and a recess
arranged below the light-transmitting part, wherein the
vehicle lighting fixture further comprising: a radar cover
arranged in a state of covering the recess and forming a
second space between the radar cover and the recess; a
bracket arranged in the second space; a radar unit arranged
in the second space in a state of detachably being fixed to the
bracket; a first fixing part fixing one end of the bracket to the
outer lens, and a second fixing part fixing the other end of
the bracket to the housing.

12 Claims, 6 Drawing Sheets

INNER SIDE IN
VEHICLE–WIDTH
DIRECTION

OUTER SIDE IN
VEHICLE–WIDTH
DIRECTION front side of
the vehicle      ⟵⟶      rear side of
the vehicle

VEHICULAR LAMP FITTING

INCORPORATION BY REFERENCE

This application is based upon and claims the benefit of priority from Japanese patent application No. 2022-115316, filed on Jul. 20, 2022, the disclosure of which is incorporated herein in its entirety by reference.

BACKGROUND

The present disclosure relates to a vehicle lighting fixture, and in particular to a vehicle lighting fixture capable of suppressing (e.g., reducing) vibrations of a radar unit (and as a result, capable of preventing the detection area of the radar unit from being significantly changed).

Japanese Unexamined Patent Application Publication No. 2020-38181 discloses a vehicle lighting fixture including a lighting-fixture housing (a lamp housing), a radar unit (a radar apparatus) attached to a plate-like part extending downward from the lower part of the lighting-fixture housing, and a radar cover arranged in front of the radar unit (see, in particular, FIG. 2 of Japanese Unexamined Patent Application Publication No. 2020-38181). The radar unit is used to detect an object. In particular, the radar unit transmits high-frequency electromagnetic waves (e.g., millimeter waves) to an area around the vehicle and receives reflected waves from an object present within the transmission range (i.e., the area around the vehicle), and thereby detects the object.

SUMMARY

However, in the vehicle lighting fixture disclosed in Japanese Unexamined Patent Application Publication No. 2020-38181, the radar unit is attached to the plate-like part which extends downward from the lower part of the lighting-fixture housing in a cantilevered manner. As a result, there is a problem that, due to vibrations of the vehicle on which the vehicle lighting fixture is mounted (e.g., due to vibrations thereof during traveling), the plate-like part extending in the cantilevered manner (and the radar unit attached to this plate-like part) widely vibrates while the base (the fixed part) of the plate-like part acts as the fulcrum, so that the detection area of the radar unit is significantly changed.

The present disclosure has been made in order to solve the above-described problem, and an object thereof is to provide a vehicle lighting fixture capable of suppressing (e.g., reducing) vibrations of a radar unit (and as a result, capable of preventing the detection area of the radar unit from being significantly changed).

A vehicular lamp fitting according to the present invention comprises a housing, an outer lens attached to the housing and forming a first space between the outer lens and the housing, and a lighting-fixture unit arranged in the first space, wherein the outer lens includes a light-transmitting part through which light emitted from the lighting-fixture unit passes and a recess arranged below the light-transmitting part, wherein the vehicle lighting fixture further comprises; a radar cover arranged in a state of covering the recess and forming a second space between the radar cover and the recess; a bracket arranged in the second space; a radar unit arranged in the second space in a state of detachably being fixed to the bracket; a first fixing part fixing one end of the bracket to the outer lens, and a second fixing part fixing the other end of the bracket to the housing.

By the above-described configuration, it is possible to suppress (e.g., reduce) vibrations of the radar unit (and as a result, to prevent the detection area of the radar unit from being significantly changed).

This is because the bracket to which the radar unit is fixed does not extend in the cantilevered manner, but one end of the bracket is fixed to the outer lens and the other end thereof is fixed to the housing.

Moreover, the vehicular lamp fitting described above may comprise a three-dimensional structure arranged behind the radar unit, wherein the three-dimensional structure may include the recess and a part of the housing arranged behind the recess.

Moreover, in the vehicular lamp fitting described above, the recess may be a light-non-transmitting part.

Moreover, in the vehicular lamp fitting described above, one of the recess and the bracket may be provided with a positioning rib abutting on the other, and a third space may be formed between the recess and the bracket by the positioning rib provided on one side abutting on the other.

Moreover, in the vehicular lamp fitting described above, the surfaces of the light-transmitting part of the outer lens and the surfaces of the radar cover may be arranged to be staggered with each other.

According to the present disclosure, it is possible to provide a vehicle lighting fixture and a radar structure capable of suppressing (e.g., reducing) vibrations of a radar unit (and as a result, capable of preventing the detection area of the radar unit from being significantly changed).

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
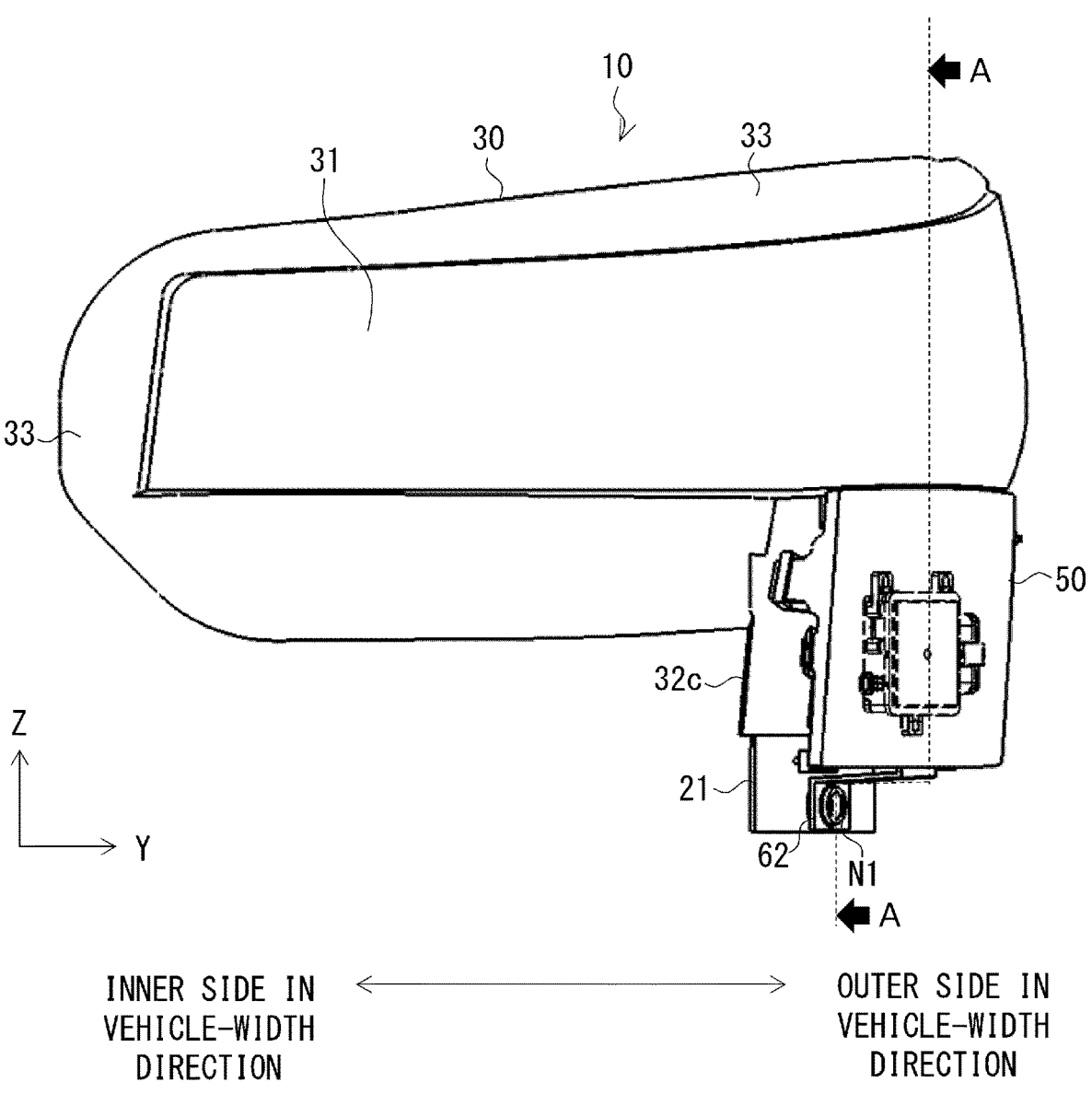
FIG. 1 is a front view of a vehicle lighting fixture 10.

A vehicle lighting fixture 10, which is an embodiment according to the present disclosure, will be described hereinafter with reference to the attached drawings. The same reference numerals (or symbols) are attached to corresponding components throughout the drawings, and redundant explanations thereof are omitted as appropriate.

Figure 2:
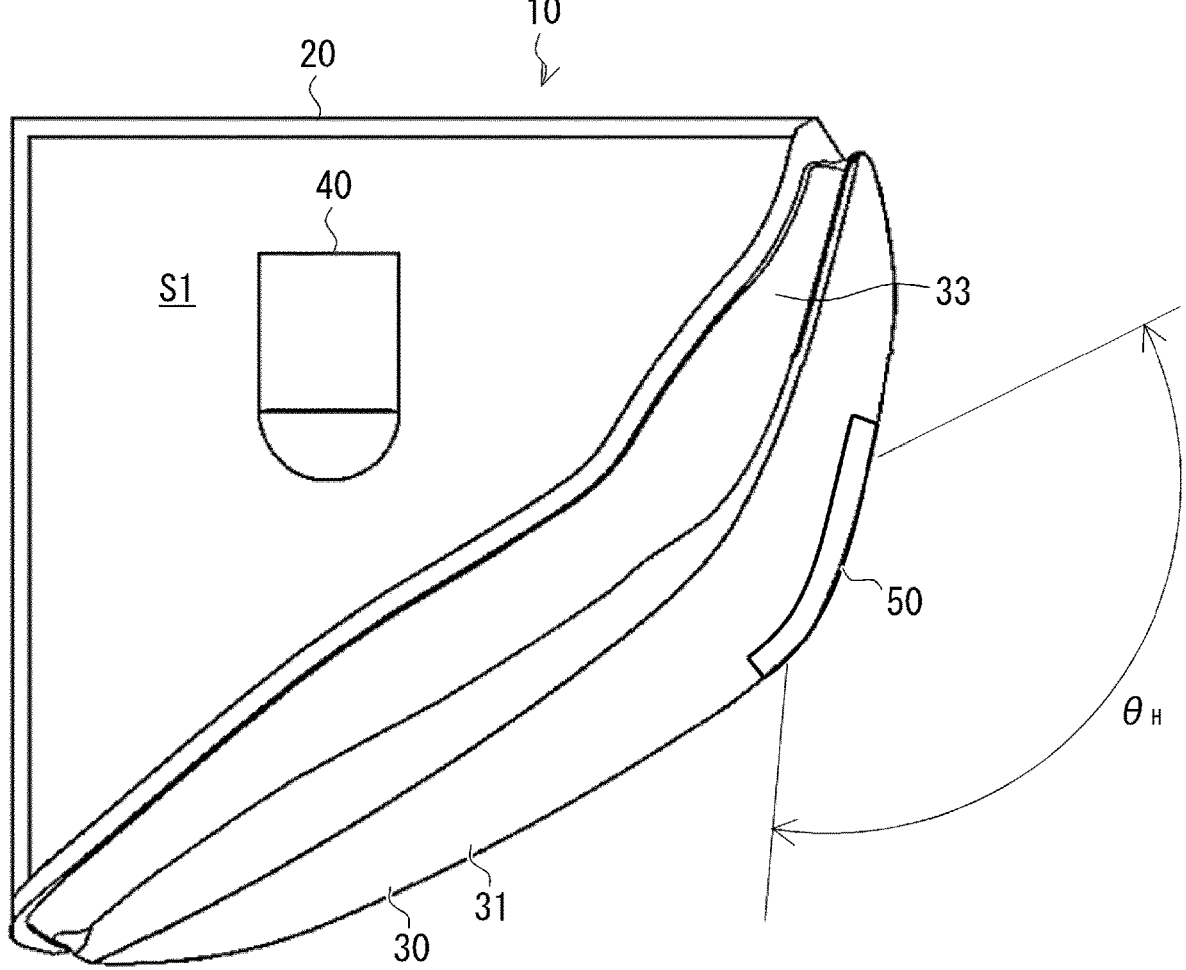
FIG. 2 is a top view of a vehicle lighting fixture 10.
Figure 3:
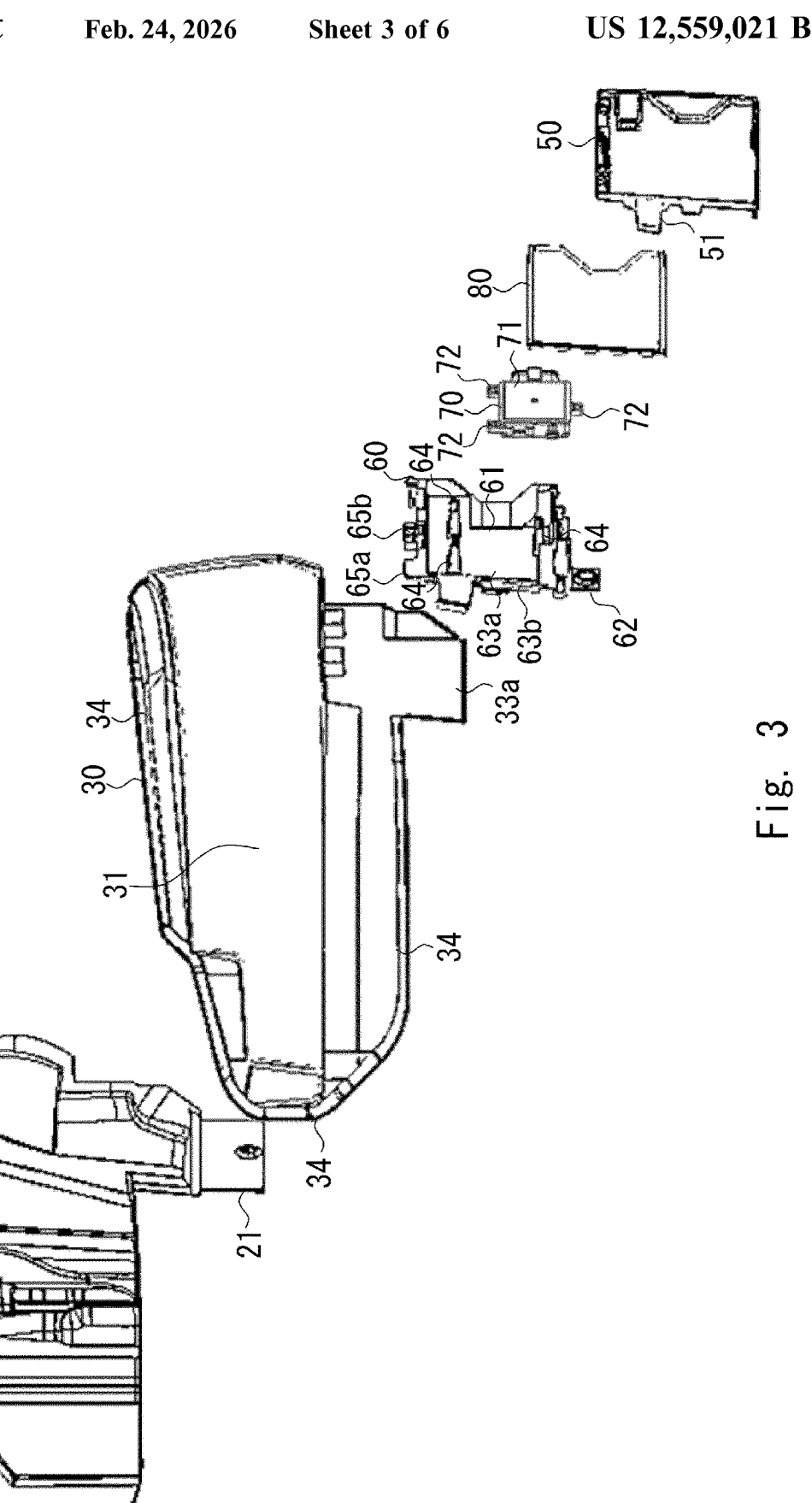
FIG. 3 is an exploded perspective view of the vehicle lighting fixture 10.
Figure 4:
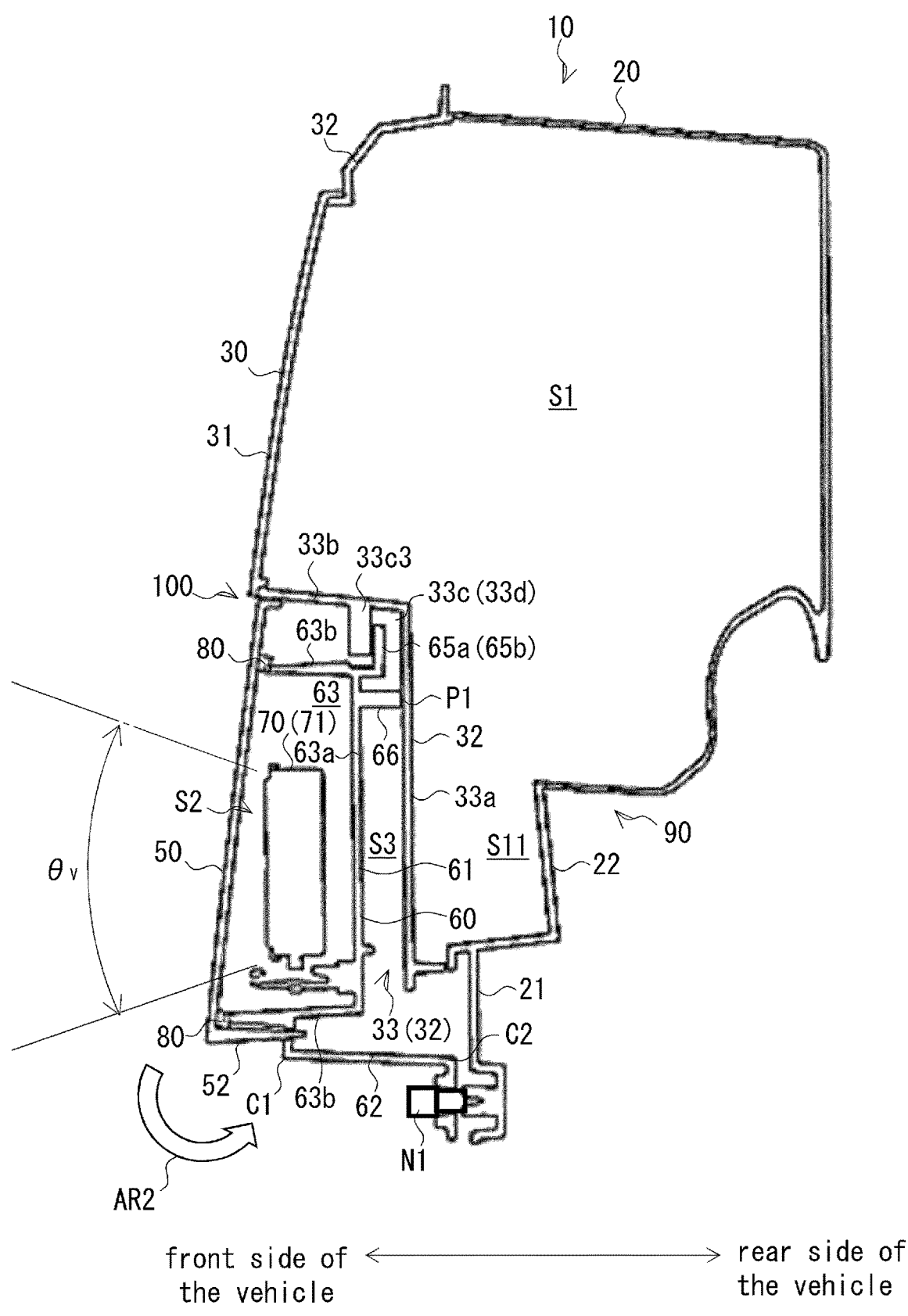
FIG. 4 is a sectional view taken along line A-A of FIG. 1.

FIG. 1 is a front view of the vehicle lighting fixture 10. FIG. 2 is a top view of the vehicle lighting fixture 10. FIG. 3 is an exploded perspective view of the vehicle lighting fixture 10. FIG. 4 is a sectional view taken along line A-A of FIG. 1.

The vehicle lighting fixture 10 according to this embodiment is a vehicle lighting fixture that functions as a headlamp, and is mounted on each of the left and right sides of the front end of a vehicle such as an automobile (not shown). Since the vehicle lighting fixture 10 mounted on both the left and right sides of the front end of the vehicle are symmetrical to each other, only the vehicle lighting fixture 10 mounted on the left side of the front end of the vehicle (the left side with respect to the traveling direction of the vehicle) will be described hereinafter as a representative example.

As shown in FIGS. 2 to 4, the vehicle lighting fixture 10 includes a housing 20, an outer lens 30, a lighting-fixture unit 40, a radar cover 50, a bracket 60, a radar unit 70, and a gasket 80.

The housing 20 is made of a synthetic resin such as polypropylene resin and includes an extension part 21 that extends below its lower end (see FIGS. 3 and 4).

The outer lens 30 is attached to the housing 20 in a state of covering the opening of the housing 20 and forming a first space S1 between the outer lens 30 and the housing 20 (see FIGS. 2 and 4). The entire circumference of the outer lens 30 is sealed with an adhesive or the like to the housing 20 (the opening).

Figure 5:
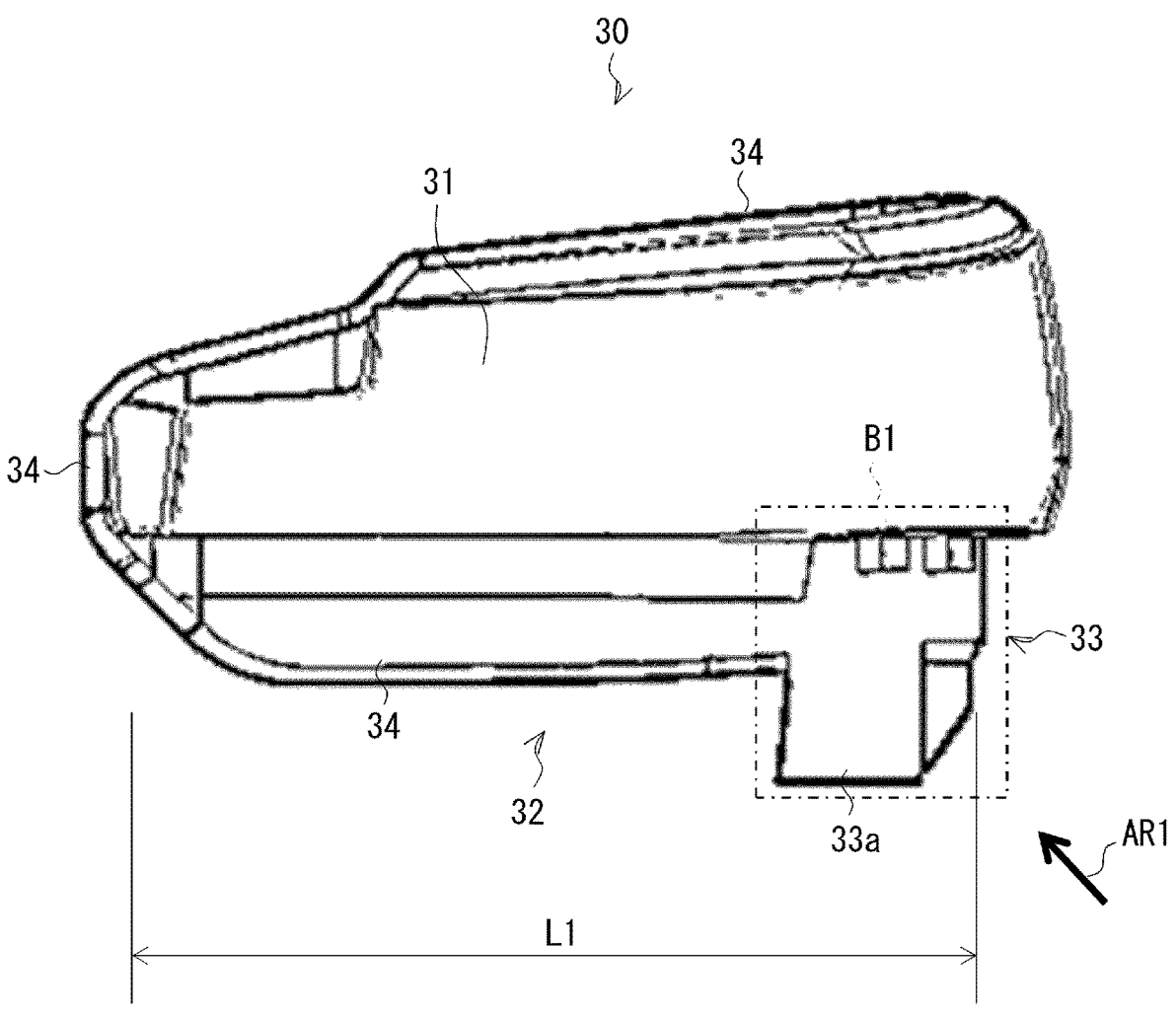
FIG. 5 is a perspective view of the outer lens 30 extracted from FIG. 3.

FIG. 5 is a perspective view of the outer lens 30 extracted from FIG. 3.

As shown in FIGS. 4 and 5, the outer lens 30 includes a light-transmitting part 31 through which light (visible light) emitted from the lighting-fixture unit 40 arranged in the first space S1 passes and a recess 32 arranged below the light-transmitting part 31.

The light-transmitting part 31 is made of a transparent material such as acrylic or polycarbonate resin (synthetic resin) that allows light (visible light) emitted by the lighting-fixture unit 40 (see FIG. 2) to pass through. The recess 32 is arranged below the light-transmitting part 31 along the lower end of the light-transmitting part 31. In FIG. 5, the recess 32 is provided within the range indicated by the reference symbol L1.

The bracket 60 (and the radar cover 50 and radar unit 70 attached to this bracket 60) is attached to the recess part (see the area enclosed by dashed rectangle B1 in FIG. 5) at the right end of the recess 32. Hereinafter, the recess part (where the bracket 60 is attached) at the right end of the recess 32 will be referred to as a bracket recess 33.

Figure 6:
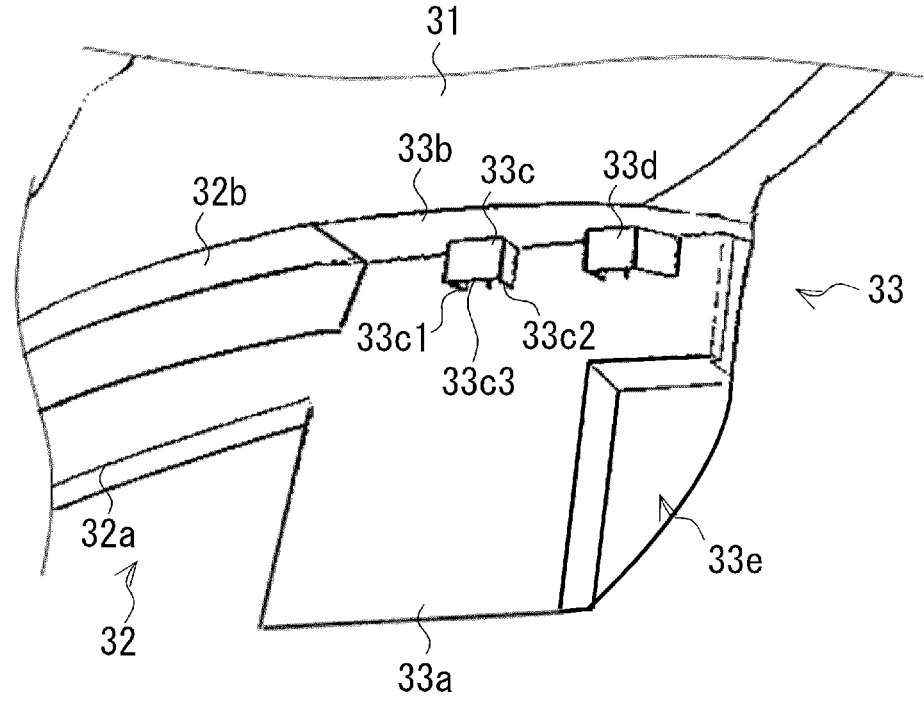
FIG. 6 is a partially enlarged view (arrow view) seen from the direction of arrow AR1 in FIG. 5.

FIG. 6 is a partially enlarged view (arrow view) seen from the direction of arrow AR1 in FIG. 5.

As shown in FIG. 6, the recess 32 is composed of a bottom 32a arranged on the rear side (the rear side of the vehicle) and an upper surface 32b arranged on the upper side of the bottom 32a. Similarly, the bracket recess 33 is composed of a bottom 33a arranged on the rear side (the rear side of the vehicle) and an upper surface 33b arranged on the upper side of the bottom 33a. The bottom 33a of the bracket recess 33 extends further downward compared to the bottom 32a of the recess 32.

The bottom 33a and the upper surface 33b of the bracket recess 33 are light-non-transmitting parts made of opaque resin (For example, black) and are integrally molded into the light-transmitting part 31 by two-color molding.

As shown in FIG. 5, a light-non-transmitting part 34, which is continuous with the bottom 33a of the bracket recess 33, is provided around the light-transmitting part 31 of the outer lens 30. The light-non-transmitting part 34 is also a light-non-transmitting part made of opaque resin (For example, black) and are integrally molded into the light-transmitting part 31 by two-color molding. Note that the outer lens 30 (including the light-transmitting part 31) may have an appropriate shape in consideration of vehicle design, etc. By making the bracket recess 33 (the bottom 33a and the upper surface 33b) a light-non-transmitting part, light from the lighting-fixture unit 40 can be prevented from leaking from the bracket recess 33. In addition, by making the bracket recess 33 (the bottom 33a and the upper surface

33b) a light-non-transmitting part, the radar unit 70 and the bracket 60 can be prevented from being visible through the outer lens 30 from above the front of the vehicle.

As shown in FIG. 6, insertion holes 33c and 33d are provided in the upper part of the bottom 33a of the bracket recess 33 for inserting the flange parts 65a and 65b provided in the upper end of the bracket 60. The insertion hole 33c is composed of a pair of right and left side walls 33c1 and 33c2 protruding forward from the bottom 33a of the bracket recess 33, and a front wall 33c3 connecting the tips of the pair of side walls 33c1 and 33c2. The insertion hole 33d is also the same.

Note that a recess 33e is formed in the bottom 33a of the bracket recess 33 to accommodate a connector (not shown) that is detachably fixed to the radar unit 70, so that the connector does not interfere.

As shown in FIG. 2, the lighting-fixture unit 40 is arranged in the first space S1 formed by the outer lens 30 and the housing 20.

The lighting-fixture unit 40 is a lighting-fixture unit for a headlamp. The lighting-fixture unit 40 may be any of a projector-type lighting-fixture unit, a reflector-type lighting-fixture unit, a direct-projection-type (direct-emission-type) lighting-fixture unit, and a lighting-fixture unit using a light guiding member (a light guiding rod or a light guiding plate), or may be any other lighting-fixture unit. When the headlamp light source for the headlamp (not shown) is turned on, light emitted from the light source for the headlamp passes through the outer lens 30 (the light-transmitting part 31), and is emitted to the outside. In this way, the headlamp is implemented.

The bracket 60 is made of a synthetic resin such as acrylic and polycarbonate. As shown in FIGS. 3 and 4, the bracket 60 includes a radar-unit holding part 61 that holds the radar unit 70, and an extension part 62 extending downward from the radar-unit holding part 61.

As shown in FIG. 4, the radar-unit holding part 61 includes a recess 63. The recess 63 is composed of a bottom 63a arranged on the rear side (the rear side of the vehicle) and a standing wall part 63b protruding forward from the outer peripheral part of the bottom 63a. The standing wall part 63b is provided around the entire circumference of the outer peripheral part of the bottom 63a.

As shown in FIG. 3, in the bottom 63a of the recess 63 of the radar-unit holding part 61, engagement parts 64 (arranged at three places in FIG. 3), which engage with flange parts 72 (three places in FIG. 3) provided in the radar unit 70 (the case 71), are provided. Each of the engagement parts 64 is, for example, a pair of claw parts (hook parts) that sandwich a respective one of the flange parts 72 provided in the radar unit 70 (the case 71) from both the left and right sides, and the engagement parts 64 are arranged at places (three places in FIG. 3) corresponding to those of the flange parts 72 (three places in FIG. 3).

Furthermore, as shown in FIG. 4, the radar-unit holding part 61 is provided with a positioning rib 66 that protrudes rearward from the radar-unit holding part 61 and abuts the bottom 33a of the bracket recess 33. Alternatively, the positioning rib 66 may be provided on the bottom 33a of the bracket recess 33 of the outer lens 30.

As shown in FIG. 4, the extension part 62 extends downward from the lower end (the standing wall part 63b) of the radar-unit holding part 61, then extends rearward via the first bending part C1, and further extends downward via the second bending part C2.

The bracket 60 is detachably fixed to the outer lens 30 (the bracket recess 33) and the housing 20 (the extension part 21). Specifically, as shown in FIG. 4, the lower end portion (an example of the other end of the bracket in the present disclosure) of the bracket 60 (the extension part 62) is fixed to the housing 20 (the extension part 21) by a screw N1. The screw N1 is an example of the second fixing part in the present disclosure.

At this time, flange parts 65a and 65b provided at the upper end of the bracket 60 (the radar unit holding part 61) are inserted into insertion holes 33c and 33d provided in the bracket recess 33 (the bottom part 33a) of the outer lens 30. In addition, the positioning rib 66 provided in the recess 63 (the bottom 63a) of the bracket 60 (the radar unit holding portion 61) abuts against the bracket recess 33 (the bottom 33a) of the outer lens 30.

Therefore, when the lower end of the bracket 60 (the extension part 62) is fixed to the housing 20 (the extension part 21) with the screw N1, the bracket 60 attempts to rotate around the contact point P1 (see FIG. 4) between positioning rib 66 and the bracket recess 33 (the bottom 33a) of the outer lens 30 (see arrow AR2 direction in FIG. 4). At that time, the flange parts 65a and 65b provided at the upper end of the bracket 60 inserted into the insertion holes 33c and 33d abut (energize) against the front wall (33c3, etc.) constituting the insertion holes 33c and 33d, so further rotation of the bracket 60 is restricted. Thus, the upper end of the bracket 60 (one example of one end of the bracket in this disclosure) is fixed to the outer lens 30 (the bracket recess 33). The insertion holes 33c and 33d are one example of the first fixing part in this disclosure.

As described above, with the bracket 60 detachably fixed to the outer lens 30 (the bracket recess 33) and the housing 20 (the extension part 21), a third space S3 is formed between the bracket recess 33 (the bottom 33a) of the outer lens 30 and the back of the bracket 60 (the radar unit holding portion 61) (see FIG. 4). By forming the third space S3, the heat dissipation of the radar unit 70 can be improved. In addition, the positioning rib 66 abuts on the bracket recess 33 (the bottom 33a) of the outer lens 30, so that the bracket 60 can be fixed in a positioned state with respect to the outer lens 30 (the bracket recess 33).

The radar cover 50 is made of a material opaque to visible light, such as a black synthetic resin. The radar cover 50 is provided to protect the radar unit 70 from, for example, a stone or the like that is accidentally flown to the vehicle, and to provide a good appearance. The radar cover 50 is arranged in a state of covering the bracket recess 33 of the outer lens 30 and forming a second space S2 (an example of the second space in the present disclosure) between the radar cover 50 and the outer lens 30 (the bracket recess 33) (see FIG. 4).

The radar cover 50 is detachably fixed to the bracket 60. Specifically, the pair of left and right hooks 51 (only one hook 51 is shown in FIG. 3) provided at the upper end of the radar cover 50 engage with the bracket 60 (not shown), and an engagement 52 (see FIG. 4) provided at the lower end of the radar cover 50 engages with the bracket 60, so that the radar cover 50 is detachably fixed to the bracket 60.

As described above, with the radar cover 50 detachably fixed to the bracket 60, the gasket 80 is arranged between the radar cover 50 and the bracket 60 as shown in FIG. 4. Thereby, the second space S2 is kept in a sealed state.

As shown in FIG. 4, the radar cover 50 is fixed to the bracket 60 so that the surface of the radar cover 50 and the surface of the light-transmitting part 31 of the outer lens 30 are staggered with each other. Specifically, by positioning the upper end portion of the radar cover 50 adjacent to the outer lens 30 rearward of the outer lens 30, a step portion 100 is formed between the outer lens 30 and the radar cover 50.

By providing the step portion 100, it is possible to suppress variations in mass-production regarding appearance. That is, if the outer lens 30 and the radar cover 50 are designed to be flush, a case in which a step portion is formed or a case in which a step portion is not formed may occur due to mass production variation. As a result, a problem occurs in which an appearance variation occurs. On the other hand, by providing a step portion (by designing with the stepped portion in mind), even if there is variation in mass production, the step portion is always formed, so that the variations in mass-production regarding appearance can be suppressed. This does not preclude the design so that the outer lens 30 and the radar cover 50 are flush without providing a step portion 100.

Note that it is sufficient if the radar cover 50 is large enough to cover the area through which electromagnetic waves transmitted from the radar unit 70 (millimeter waves having the angle of divergence Ov in the vertical direction (hereinafter also referred to as the vertical divergence angle $\theta_V$) (see FIG. 4) and the angle of divergence OH in the horizontal direction (hereinafter also referred to as the horizontal divergence angle $\theta_H$) (see FIG. 2)) pass through, and may have an arbitrary shape as desired according to the design of the vehicle or the like as long as it satisfies the aforementioned condition.

The radar unit 70 (the radar apparatus) includes the case 71, a transmitting antenna and a receiving antenna (both of which are not shown) housed in the case 71, and so on. The radar unit 70 is a millimeter-wave radar unit that transmits electromagnetic waves (millimeter waves) from the transmitting antenna. The electromagnetic waves (the millimeter waves) pass through the radar cover 50 and are transmitted to a range having a vertical divergence angle $\theta_V$ (see FIG. 4) and a horizontal divergence angle $\theta_H$ (see FIG. 2). Further, the radar unit 70 receives, by the receiving antenna, reflected waves which have been reflected by an object present in the aforementioned transmission range and have passed through the radar cover 50. The received signal is processed by a control apparatus such as an ECU (Electronic Control Unit) (not shown), so that the object (e.g., a distance, an angle, and a velocity of the object) is detected. In the radar unit 70, for example, millimeter waves in a frequency band of 76 to 81 GHz, in particular, in a frequency band of 79 GHZ, are used. However, the frequency band is not limited to these frequency bands.

Note that the radar method of the radar unit 70 may be either a pulse method or a CW (Continuous Wave) method, or may be any other method. Further, the antenna method of the radar unit 70 may be any of a mechanical scanning method, a beam switching method, a phased array method, and a digital forming method, or may be any other method.

The radar unit 70 is detachably fixed to the bracket 60. Specifically, the radar unit 70 is detachably fixed to the bracket 60 as the engagement parts 64 (three places in FIG. 3) provided in the bracket 60 engage with the flange parts 72 (three places in FIG. 3) provided in the case 71. Note that the radar unit 70 may be detachably fixed to the bracket 60 by using, instead of using the engagement parts 64, known fixing means such as screws.

As shown in FIG. 4, a three-dimensional structure 90 is arranged behind the radar unit 70. The three-dimensional structure 90 includes the bracket recess 33 (the bottom portion 33a) and a part 22 of the housing 20 arranged via a part space S11 of the first space S1 behind the bracket recess 33 (the bottom portion 33a). This three-dimensional structure 90 (the part space S11 of the first space S1) serves as an air layer and serves as a heat insulator. This prevents engine heat from the rear of the vehicle from directly acting on the radar unit 70. The part space S11 of the first space S1 is arranged behind the bracket recess 33 (the bottom 33a). On the other hand, the second space S2 and the third space S3 are arranged in front of the bracket recess 33 (the bottom 33a). With this arrangement, when a collision with a pedestrian or the like causes an impact from the front (or above) of the vehicle, the radar unit 70 passes through the second space S2. Furthermore, the three-dimensional structure 90 having the part space S11 of the first space S1 deforms before the radar unit 70 does. At that time, since the radar unit 70 only moves, the impact on the radar unit 70 can be mitigated. It is desirable to design the bracket recess 33 so that it is more easily deformed when there is an impact above a certain threshold from the front of the vehicle equipped with the vehicle lighting fixture 10. For example, it is desirable to use a material (such as acrylic resin) that is easily deformed upon impact as the material for the bracket recess 33 of the three-dimensional structure (Design 1). It is also desirable to make the thickness of the bracket recess 33 (at least the bottom 33a) thinner than the other light-non-transmitting part 34 (Design 2). Furthermore, it is desirable to form a groove (such as a triangular groove) on the back surface of the bracket recess 33 (at least the bottom 33a) to facilitate rupture (Design 3). Note that one of the designs from Design 1 to Design 3 may be adopted, or multiple designs may be adopted.

Although it is not shown in the drawings, the vehicle lighting fixture 10 having the above-described configuration is mounted on the vehicle by fixing a flange part(s) provided in the housing 20 to the vehicle (e.g., the frame of the vehicle body or the bumper) by screws. Although not shown, the recess 32 of the outer lens 30 other than the bracket recess 33 are covered with a bumper or the like. The bumper or the like that covers recesses other than the bracket recess 33 and the radar cover 50 that covers the bracket recess 33 appear to be arranged adjacent to each other.

Next, a procedure for detachably fixing the bracket 60, to which the radar unit 70 and the radar cover 50 are detachably fixed as described above, to the outer lens 30 (the bracket recess 33) will be described.

Firstly, the flange parts 65a and 65b provided at the upper end of the bracket 60 (the radar-unit holding part 61) are inserted into the insertion holes 33c and 33d provided in the bottom 33a of the bracket recess 33 of the outer lens 30 (see FIG. 4).

Next, the lower end of the bracket 60 (the extension part 62) is screwed onto the extension part 21 of the housing 20 with screw N1 (see FIG. 4). As a result, the lower end of the bracket 60 (an example of the other end of the bracket disclosed herein) is fixed to the housing 20 (the extension part 21).

At this time, the bracket 60 attempts to rotate around the contact point P1 between the positioning rib 66 and the bracket recess 33 (the bottom 33a) of the outer lens 30 (see arrow AR2 direction in FIG. 4). However, the flange parts 65a and 65b provided at the upper end of the bracket 60 inserted into the insertion holes 33c and 33d abut (energize) against the front wall (33c3, etc.) constituting the insertion holes 33c and 33d, so further rotation of the bracket 60 is restricted. Thus, the upper end of the bracket 60 is fixed to the outer lens 30 (the bracket recess 33).

Since the lower end of the bracket 60 (the extension part 62) is fixed to the housing 20 (the extension part 21), and the upper end of the bracket 60 is fixed to the outer lens 30 (the bracket recess 33), the bracket 60 is prevented from widely vibrating even when the vehicle on which the vehicle lighting fixture 10 is mounted vibrates during traveling. As a result, it is possible to prevent the detection area (Field of View, i.e., the detection width) of the radar unit 70 from widely shaking, and thereby to prevent an error, such as losing sight of the target, from occurring.

In the vehicle lighting fixture 10 having the above configuration, the radar cover 50 and the radar unit 70 are detachably fixed to the bracket 60. Therefore, the radar cover 50 and the radar unit 70 can be removed from the bracket 60 and replaced with another radar unit 70.

As described above, according to this embodiment, it is possible to suppress (e.g., reduce) vibrations of the radar unit 70 (and as a result, to prevent the detection area of the radar unit 70 from being significantly changed).

This is because the bracket 60 to which the radar unit 70 is fixed does not extend in the cantilevered manner, but the lower end of the bracket 60 (the extension part 62) is fixed to the housing 20 (the extension part 21), and the upper end of the bracket 60 is fixed to the outer lens 30 (the bracket recess 33).

In addition, according to this embodiment, the space not conventionally utilized, that is, the recess 32 of the outer lens 30 covered with the bumper or the like, can be effectively utilized as an installation space (the bracket recess 33) for the radar unit 70 or the like. Note that the space (the space that is not visible from the outside) not conventionally utilized is provided to secure the installation space of the lighting fixture control unit or to prevent light leakage.

In addition, according to this embodiment, the third space S3 is formed between the recess 32 and the bracket 60 of the outer lens 30 by the positioning rib 66. This has the advantage that the heat generated by the lighting-fixture unit 40 is insulated in the third space S3 and the influence on the radar unit 70 can be suppressed. This is due to the heat insulating effect of the third space S3 formed by the positioning rib 66. The heat insulating effect of the third space S3 can maintain the second space S2 (the space formed by the bracket recess 33 and the radar cover 50), which becomes cold by being cooled by the air received by the radar cover 50 during running, and can prevent the temperature rise of the radar unit 70. In this embodiment, as shown in FIG. 4, the part space S11 of the first space S1 is arranged behind the bracket recess 33 (the bottom 33a). On the other hand, the second space S2 and the third space S3 are arranged in front of the bracket recess 33 (the bottom 33a). Therefore, the heat insulating effect of the third space S3 can be maximized.

Further, according to this embodiment, there is another advantage that the radar unit 70 can be easily repaired or replaced in the event of failure thereof. This is because each of the radar unit 70 and the radar cover 50 is detachably fixed to the bracket 60, so that the radar unit 70 can be replaced by removing the radar cover 50 from the bracket 60 without removing the vehicle lighting fixture 10 itself from the vehicle (not shown).

Further, according to this embodiment, it is possible to prevent the distance between the radar unit 70 and the radar cover 50 from changing (and as a result, to prevent noise from occurring in electromagnetic waves (radar signals) that pass through the radar cover 50 and are transmitted to an area around the vehicle). In this way, it is possible to prevent the accuracy of the detection of an object present around the vehicle from deteriorating.

This is because the radar unit 70 and the radar cover 50 are fixed to one and the same bracket 60, i.e., since the radar unit 70 and the radar cover 50 are fixed to the same bracket 60, the radar unit 70 and the radar cover 50 vibrate in the same manner as each other when they vibrate due to vibrations of the vehicle on which the vehicle lighting fixture 10 is mounted (e.g., due to vibrations thereof during the traveling), so that the distance between the radar unit 70 and the radar cover 50 does not change.

In the above embodiment, the lower end of the bracket 60 (the extension part 62) is fixed to the housing 20 (the extension part 21) and the upper end of the bracket 60 is fixed to the outer lens 30 (the bracket recess 33), but it is not limited to this. For example, although not shown, both the lower end of the bracket 60 (the extension part 62) and the upper end of the bracket 60 may be fixed to the outer lens 30 (the bracket recess 33).

Further, although an example in which a vehicle lighting fixture according to the present disclosure is applied to a headlamp has been described in the above-described embodiment, the present disclosure is not limited to this example. For example, the present disclosure may be applied to a vehicle lighting fixture other than the headlamp. For example, the present disclosure may be applied to a vehicle lighting fixture such as a rear combination lamp, and may also be applied to other vehicle lighting fixtures.

All the numeral values mentioned in the above-described embodiments are merely examples, and numeral values different from them can be uses as appropriate.

The above-described embodiments are merely examples in all the aspects thereof. The present disclosure should not be limited by the descriptions of the above-described embodiments. The present disclosure may be carried out in various other forms without departing from the spirit or main features of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicle lighting fixture comprising a housing, an outer lens attached to the housing and forming a first space between the outer lens and the housing, and a lighting-fixture unit arranged in the first space, wherein
   the outer lens includes a light-transmitting part through which light emitted from the lighting-fixture unit passes and a recess arranged below the light-transmitting part, wherein
   the vehicle lighting fixture further comprises:
   a radar cover arranged in a state of covering the recess and forming a second space between the radar cover and the recess;
   a bracket arranged in the second space;
   a radar unit arranged in the second space in a state of detachably being fixed to the bracket;
   a first fixing part fixing one end of the bracket to the outer lens, and
   a second fixing part fixing the other end of the bracket to the housing, wherein
   the recess is a light-non-transmitting part.

2. The vehicle lighting fixture according to claim 1 further comprising:
   a three-dimensional structure arranged behind the radar unit, wherein the three-dimensional structure includes the recess and a part of the housing arranged behind the recess.

3. The vehicle lighting fixture according to claim 1, wherein
   one of the recess and the bracket is provided with a positioning rib abutting on the other, and
   a third space is formed between the recess and the bracket by the positioning rib provided on one side abutting on the other.

4. The vehicle lighting fixture according to claim 2, wherein
   one of the recess and the bracket is provided with a positioning rib abutting on the other, and
   a third space is formed between the recess and the bracket by the positioning rib provided on one side abutting on the other.

5. The vehicle lighting fixture according to claim 3, wherein
   a three-dimensional structure includes the recess and a part of the housing that is arranged behind the bottom of the recess via a portion of the first space.

6. The vehicle lighting fixture according to claim 3, wherein
   a portion of the first space is arranged behind the bottom of the recess, and the second space and the third space are arranged in front of the bottom of the recess.

7. A vehicle lighting fixture comprising a housing, an outer lens attached to the housing and forming a first space between the outer lens and the housing, and a lighting-fixture unit arranged in the first space, wherein
   the outer lens includes a light-transmitting part through which light emitted from the lighting-fixture unit passes and a recess arranged below the light-transmitting part, wherein
   the vehicle lighting fixture further comprises:
   a radar cover arranged in a state of covering the recess and forming a second space between the radar cover and the recess;
   a bracket arranged in the second space;
   a radar unit arranged in the second space in a state of detachably being fixed to the bracket;
   a first fixing part fixing one end of the bracket to the outer lens, and
   a second fixing part fixing the other end of the bracket to the housing, wherein
   the surfaces of the light-transmitting part of the outer lens and the surfaces of the radar cover are arranged to be staggered with each other.

8. The vehicle lighting fixture according to claim 7, further comprising:
   a three-dimensional structure arranged behind the radar unit, wherein
   the three-dimensional structure includes the recess and a part of the housing arranged behind the recess.

9. A vehicle lighting fixture comprising a housing, an outer lens attached to the housing and forming a first space between the outer lens and the housing, and a lighting-fixture unit arranged in the first space, wherein
   the outer lens includes a light-transmitting part through which light emitted from the lighting-fixture unit passes and a recess arranged below the light-transmitting part, wherein
   the vehicle lighting fixture further comprises:
   a radar cover arranged in a state of covering the recess and forming a second space between the radar cover and the recess;

a radar apparatus arranged in the second space, configured to transmit electromagnetic waves and receive reflected waves; and a radar apparatus holding member that holds the radar apparatus, wherein a first fixing part is provided at one end of the radar apparatus holding member and configured to be fixed to the outer lens;

an opposite end of the radar apparatus holding member, different from the first fixing part, fixed to the housing or the outer lens by a second fixing part;

wherein the radar cover is fixed to the radar apparatus holding member;

wherein the radar cover is made of a resin material; and wherein the radar cover and the radar apparatus holding member are fixed so as to maintain the second space in a sealed state.

10. The vehicle lighting fixture according to claim 9, wherein a gasket is disposed between the radar cover and the radar apparatus holding member.

11. The vehicle lighting fixture according to claim 9, wherein the radar apparatus and the radar cover are fixed to the radar apparatus holding member.

12. The vehicle lighting fixture according to claim 10, wherein the radar apparatus and the radar cover are fixed to the radar apparatus holding member.

* * * * *